United States Patent Office 3,481,751
Patented Dec. 2, 1969

3,481,751
BARIUM FLINT OPHTHALMIC SEGMENT GLASS
Gordon F. Brewster, Williamson, and Robert A. Weidel, Webster, N.Y., assignors to Bausch & Lomb Incorporated, Rochester, N.Y., a corporation of New York
No Drawing. Filed Mar. 15, 1967, Ser. No. 623,240
Int. Cl. C03c *3/10, 3/04*
U.S. Cl. 106—53                     1 Claim

ABSTRACT OF THE DISCLOSURE

Transparent glass containing oxides of lead, silicon, boron, alkali metals, and barium. Useful as segment glass in manufacture of multi-focal lenses for spectacles by fusion to optical crown glass.

DESCRIPTION OF THE INVENTION

In the manufacture of multi-focal ophthalmic lenses by the fusion process one or more glass segments are bonded to a major blank portion of crown glass. The segment and major area glasses have different refractive index values, resulting in a lens having multiple dioptric powers. Generally, the segment glasses have a lower softening point than the major crown glass, so that a preformed blank retains its shape during the fusion of the segment glass to the major blank portion.

A glass composition has been found having numerous desirable properties for use as a segment in bifocal and trifocal ophthalmic lenses. The barium flint glass of this invention forms an optical quality bond with a crown glass blank. The crown glass composition of the major piece of the lens has a softening point higher than the segment glass, but the coefficient of thermal expansion for all glasses to be fused should be equal. Other advantages of the barium flint glass are high chemical durability and resistance to devitrification during heating. The use of barium oxide in a glass permits an increase in the refractive index without introducing high dispersion color.

The preferred barium flint glass is made by melting the following components, in weight percentages calculated from their batch ingredients: 37.16 weight percent $SiO_2$, 16.65% BaO, 3.71% ZnO, 0.15% $Li_2O$, 9.02% $Na_2O$, 1.51% $K_2O$, 7.25% $TiO_2$, 7.43% $ZrO_2$, 6.67% CaO, 7.02% $B_2O_3$, 3.97% PbO, and 1.00% $Al_2O_3$. The major ingredients, $SiO_2$, BaO and total alkali metal oxide, can be varied slightly for optimum refractive index and expansion control. About two parts per hundred is considered a maximum change in the major ingredients; while about five parts per thousand is considered maximum for the remaining minor ingredients. The oxides of barium and the alkali metals may be introduced as carbonates in the batch. Boron may be added as borax, and sand can supply the silica.

A typical manufacturing schedule for nine pounds of glass includes the steps of (1) mixing the batch ingredients, (2) filling the batch material into a platinum crucible maintained at 2500° F. over a period of 2.5 to 3 hours, (3) stirring the melted glass with a platinum stirrer at 2525° F. for about 18.5 to 19 hours, beginning about one hour after filling, (4) cooling to 2325° F. during the ½ hour before casting, (5) casting the glass melt on preheated molds at 300–400° F., and (6) annealing the cast glass product at 1080° F. with slow cooling to room temperature.

The barium flint glass produced by the above process has a refractive indev ($n_D$) of 1.6530 and Abbe value ($\nu$) of 42.3. The transmittance of a clear 10 mm. thick sample is about 74 to 88% in the visible waveband. A softening point of 690° C. permits fusion with several commercial optical crown glasses having a higher softening point. The thermal expansion coefficient is about $10.0 \times (10)^{-6}/°$ C. in the range of 25° to 500° C.

A trifocal spectacle lens was made using the barium flint as a high index segment. The major crown glass piece of the ophthalmic blank was a C.I.T. type 523/586 clear optical glass having a thermal expansion coefficient value matching that of the barium flint and a third intermediate index segment glass. The highest dioptric power segment was fused to the major piece and the intermediate segment. The other segment glass was a C.I.T. type 588/521 light barium crown having the same softening point as the barium flint. The fusion can be one of several conventional processes, such as disclosed in U.S. Patent 2,112,659 or 2,963,823, for example. Subsequent grinding, polishing and sedging steps produce a finished multifocal lens.

We claim:
1. An ophthalmic segment glass consisting essentially of 37.16 weight percent $SiO_2$, 16.65% BaO, 3.71% ZnO, 0.15% $Li_2O$, 9.02% $Na_2O$, 1.51% $K_2O$, 7.25% $TiO_2$, 7.43% $ZrO_2$, 6.67% CaO, 7.02% $B_2O_3$, 3.97% PbO, and 1.00% $Al_2O_3$, said glass having a refractive index ($n_D$) of about 1.6530 and an Abbe value ($\nu$) of about 42.3, and having a softening point of about 690° C. and a thermal expansion coefficient of about $10.0 \times (10)^{-6}/°$ C. in the range of 25° to 500° C.

References Cited

UNITED STATES PATENTS

| | | | |
|---|---|---|---|
| 3,294,560 | 12/1966 | Duncan | 106—54 |
| 3,311,480 | 3/1967 | Brewster et al. | 106—54 |

HELEN M. McCARTHY, Primary Examiner

U.S. Cl. X.R.

106—52, 54